(12) United States Patent
Kawanishi

(10) Patent No.: US 11,025,136 B2
(45) Date of Patent: Jun. 1, 2021

(54) DYNAMO-ELECTRIC MACHINE

(71) Applicant: MEIDENSHA CORPORATION, Tokyo (JP)

(72) Inventor: Kota Kawanishi, Tokyo (JP)

(73) Assignee: MEIDENSHA CORPORATION, Tokyo (JP)

(*) Notice: Subject to any disclaimer, the term of this patent is extended or adjusted under 35 U.S.C. 154(b) by 0 days.

(21) Appl. No.: 16/978,302

(22) PCT Filed: Feb. 26, 2019

(86) PCT No.: PCT/JP2019/007163
§ 371 (c)(1),
(2) Date: Sep. 4, 2020

(87) PCT Pub. No.: WO2019/172007
PCT Pub. Date: Sep. 12, 2019

(65) Prior Publication Data
US 2021/0006131 A1 Jan. 7, 2021

(30) Foreign Application Priority Data
Mar. 9, 2018 (JP) .............................. JP2018-042614

(51) Int. Cl.
*H02K 9/19* (2006.01)
*H02K 9/02* (2006.01)
(Continued)

(52) U.S. Cl.
CPC ................. *H02K 9/19* (2013.01); *H02K 1/20* (2013.01); *H02K 5/12* (2013.01); *H02K 5/20* (2013.01); *H02K 9/02* (2013.01); *H02K 9/04* (2013.01)

(58) Field of Classification Search
CPC .. H02K 9/19; H02K 9/02; H02K 9/04; H02K 1/20; H02K 5/12; H02K 5/20; H02K 9/00;
(Continued)

(56) References Cited

U.S. PATENT DOCUMENTS 5,859,482 A * 1/1999 Crowell .................... H02K 5/20
310/54
6,218,747 B1 4/2001 Tsuruhara
(Continued)

FOREIGN PATENT DOCUMENTS

| CN | 107147260 A | 9/2017 |
|---|---|---|
| DE | 19949137 A1 | 9/2000 |

(Continued)

OTHER PUBLICATIONS

Usami Toshikazu, Rotary Electric Machine for Vehicle, Oct. 7, 2013, Hitachi Automotive, JP 2013207944 (English Machine Translation) (Year: 2013).*

(Continued)

*Primary Examiner* — Quyen P Leung
*Assistant Examiner* — Alexander A Singh
(74) *Attorney, Agent, or Firm* — Foley & Lardner LLP

(57) ABSTRACT

Dynamo-electric machine (10) has cylindrical frame (11), cylindrical stator (12) fixed to an inside of the frame (11), cylindrical rotor (13) provided inside the stator (12) such that gap (G) is formed between the rotor (13) and the stator (12), rotation shaft (14) fixed to the rotor (13) so as to penetrate an inside of the rotor (13), and bracket (15) fixed to the frame (11) and rotatably supporting the rotation shaft (14). The stator (12) has duct (12a) radially formed at a middle portion in an axial direction of the stator (12) and communicating with the gap (G). The frame (11) has first supply opening (16) through which cooling air flow (1) is (Continued)

supplied in the frame (11) at axial direction both end sides of the frame (11), and second supply opening (17) through which cooling air flow (1) is supplied to the duct (12a) of stator (12).

2 Claims, 5 Drawing Sheets

(51) Int. Cl.
*H02K 5/20* (2006.01)
*H02K 1/20* (2006.01)
*H02K 9/04* (2006.01)
*H02K 5/12* (2006.01)

(58) Field of Classification Search
CPC ............ H02K 9/005; H02K 9/06; H02K 9/08; H02K 9/10; H02K 9/12; H02K 9/14; H02K 9/16; H02K 9/18; H02K 9/193; H02K 9/197; H02K 9/20; H02K 9/22; H02K 9/24; H02K 9/26; H02K 9/28
USPC ..... 310/52, 53, 54, 55, 56, 57, 58, 59, 60 A, 310/64
See application file for complete search history.

(56) References Cited

U.S. PATENT DOCUMENTS

| | | | |
|---|---|---|---|
| 6,304,011 B1* | 10/2001 | Pullen | H02K 1/20 310/52 |
| 2003/0075996 A1 | 4/2003 | Yoshida et al. | |
| 2011/0133580 A1* | 6/2011 | Sugimoto | B60L 3/0061 310/54 |
| 2011/0241350 A1 | 10/2011 | Kori et al. | |
| 2015/0171707 A1* | 6/2015 | Shoykhet | H02K 9/00 310/54 |

FOREIGN PATENT DOCUMENTS

| | | |
|---|---|---|
| JP | 63-70260 U | 5/1988 |
| JP | 6-44378 U | 6/1994 |
| JP | 8-322188 A | 12/1996 |
| JP | 08322188 * | 12/1996 |
| JP | 2002-186221 A | 6/2002 |
| JP | 2008-301646 A | 12/2008 |
| JP | 2011-211816 A | 10/2011 |
| JP | 2013-207944 A | 10/2013 |
| JP | 2013207944 A * | 10/2013 |

OTHER PUBLICATIONS

Korogi Keiichi, Forced Air Cooling Motor, Dec. 3, 1996, Meidensha Electric, JP 08322188 (English Machine Translation) (Year: 1996).*
Extended European Search Report, Application No. 19764130.1, dated Mar. 23, 2021, 8 pages.

* cited by examiner

DYNAMO-ELECTRIC MACHINE

TECHNICAL FIELD

The present invention relates to a dynamo-electric machine such as a generator and an electric motor.

BACKGROUND ART

In a dynamo-electric machine such as a large-sized generator and a large-sized electric motor for which high output (high power) and high speed rotation are required, since a thick high-voltage insulating paper is used at an inside of a stator and a winding portion such as a coil end in response to the high output and also a magnet of a rotor is fixed to a rotation shaft with the magnet being surrounded with a ring in response to the high speed rotation, there is a tendency for the winding portion of the stator and a magnet portion of the rotor not to easily radiate or release heat, then this causes an increase in temperature.

For this problem, for instance, the following Patent Document 1 has proposed that the stator and the rotor should be cooled by providing a water-cooling jacket between a frame and the stator, forming a ventilation path between the water-cooling jacket and the frame, making cooling water flow in the water-cooling jacket and making air inside the frame circulate through the ventilation path.

CITATION LIST

Patent Document

Patent Document 1: Japanese Unexamined Patent Application Publication No. 2011-211816
Patent Document 2: Japanese Unexamined Patent Application Publication No. 2008-301646

SUMMARY OF THE INVENTION

Technical Problem

According to demands for an even higher output and an even higher speed rotation, further improvement in cooling performance has been strongly required for such large-sized dynamo-electric machine described above.

Solution to Problem

In order to meet the above demands, a dynamo-electric machine of the present invention comprises: a cylindrical frame; a cylindrical stator fixed to an inside of the frame; a cylindrical rotor provided inside the stator such that a gap is formed between the rotor and the stator; a rotation shaft fixed to the rotor so as to penetrate an inside of the rotor; and a bracket fixed to the frame and rotatably supporting the rotation shaft, wherein the stator has a duct radially formed at a middle portion in an axial direction of the stator and communicating with the gap, and the frame has a first supply opening through which cooling air flow is supplied in the frame at axial direction both end sides of the frame, an exhaust opening through which cooling air flow in the frame is exhausted to an outside of the frame and a second supply opening through which cooling air flow is supplied to the duct of the stator.

The dynamo-electric machine of the present invention further comprises: cooling-water pipes provided as a pair at one end side and the other end side of a middle in the axial direction of the frame, wherein the cooling-water pipes has, at the middle in the axial direction of the frame, inlets through which cooling water is supplied to the cooling-water pipes and has, at the axial direction both end sides of the frame, outlets through which the cooling water is exhausted from the cooling-water pipes.

In the dynamo-electric machine of the present invention, the frame is an aluminum metal-made frame having the cooling-water pipes between an outer peripheral surface and an inner peripheral surface of the frame by casting.

Effects of Invention

When supplying the cooling air flow into the first and second supply openings of the dynamo-electric machine of the present invention, the cooling air flow supplied from the first supply opening flows to the both end sides in the axial direction in the frame while cooling coil ends etc., and is exhausted to the outside of the frame from the exhaust opening. The cooling air flow supplied from the second supply opening flows in the duct of the stator while cooling the stator from the middle portion in the axial direction of the stator, and reaches the gap. This cooling air flow branches off from the axial direction middle portion, further flows in the gap toward the both end sides of the frame while cooling an inner peripheral surface of the stator and an outer peripheral surface of the rotor, flows out from the gap, and is exhausted to the outside of the frame from the exhaust opening.

Therefore, according to the dynamo-electric machine of the present invention, not only the coil ends can be cooled, but also an inside of the axial direction middle portion of the stator, which is highest in temperature at the stator, can be air-cooled from a radial direction outer side to a radial direction inner side, and further the inner peripheral surface of the stator and an outer peripheral surface of the rotor can be air-cooled from the axial direction middle portion to the both end sides. Hence, even in a case where a thick high-voltage insulating paper is used at the inside of the stator and winding portions such as the coil ends in response to the high output and also the rotor is fixed to the rotation shaft with a permanent magnet being surrounded with a ring in response to the high speed rotation, the inside of the stator, the winding portions such as the coil ends and the permanent magnet of the rotor are effectively cooled, and the temperature increase can be greatly suppressed.

Accordingly, according to the dynamo-electric machine of the present invention, the cooling performance is further improved, and even higher output and even higher speed rotation can be achieved.

EMBODIMENTS FOR CARRYING OUT THE INVENTION

An embodiment of a dynamo-electric machine according to the present invention will be explained below with reference to the drawings. However, the present invention is not limited to the following embodiment explained using the drawings.

Main Embodiment

A main embodiment of the dynamo-electric machine according to the present invention will be explained with reference to FIGS. 1 to 5.

Figure 1:
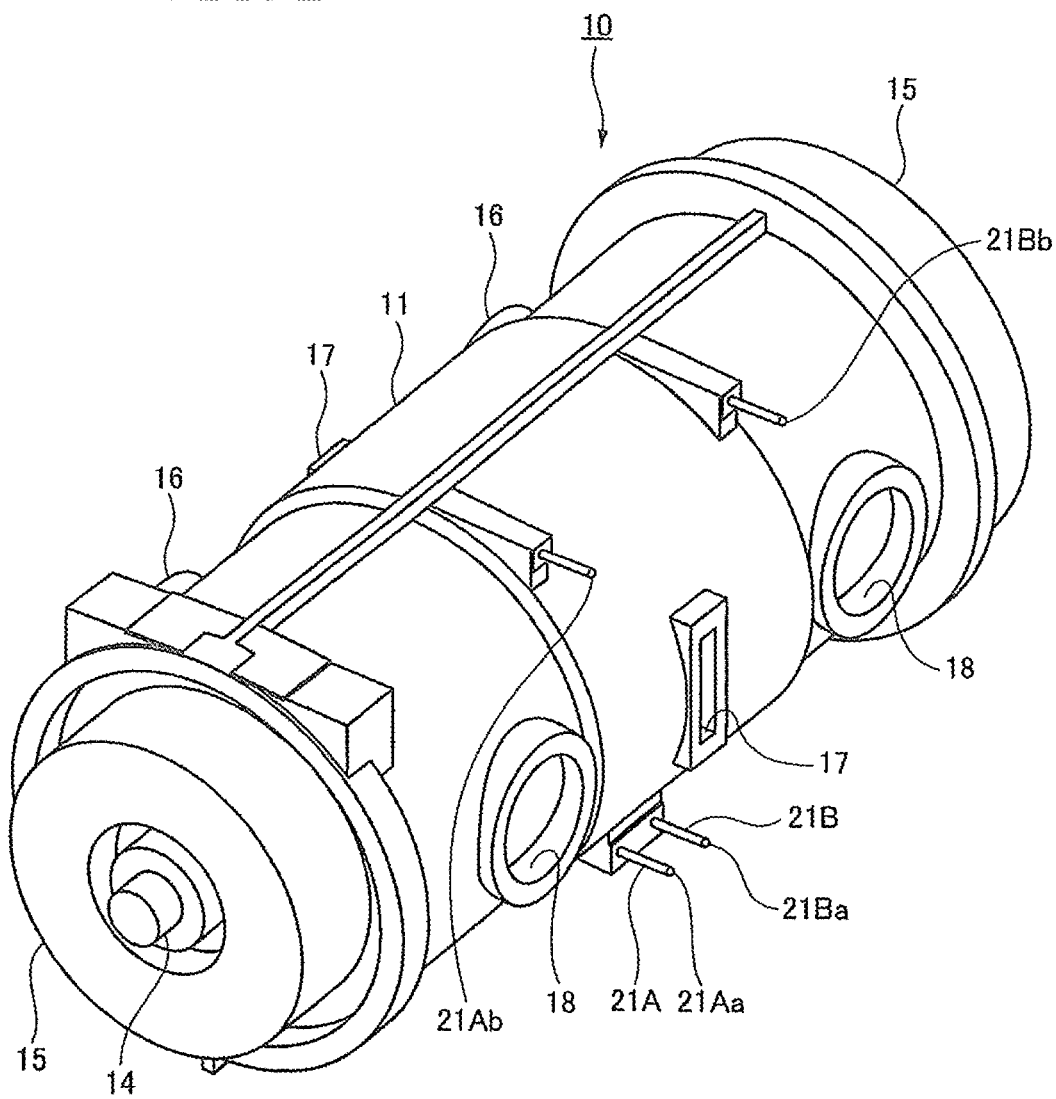
FIG. 1 is an external view of a main part of a dynamo-electric machine according to a main embodiment of the present invention.
Figure 2:
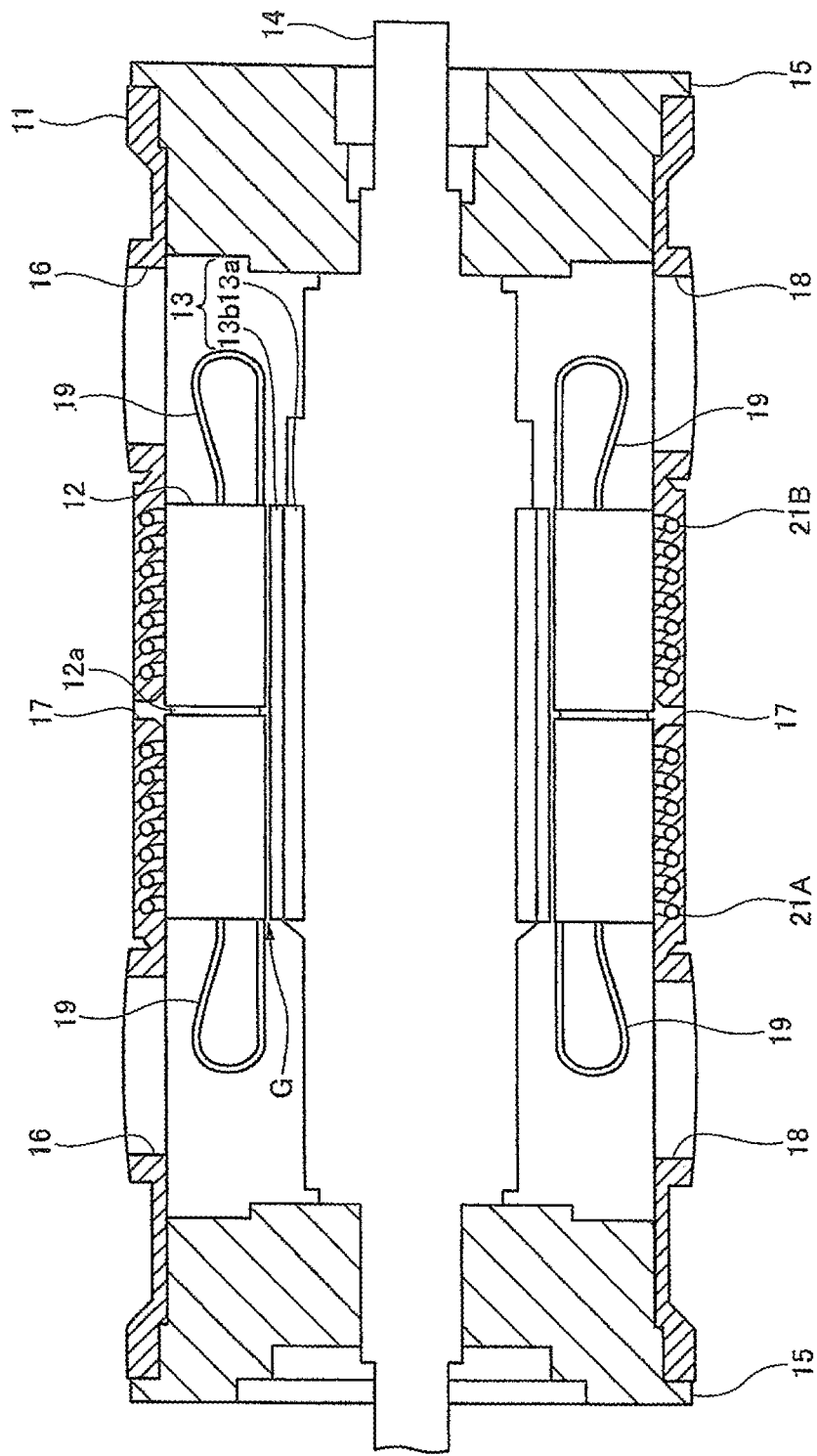
FIG. 2 is a schematic sectional view of the dynamo-electric machine shown in FIG. 1.
Figure 3:
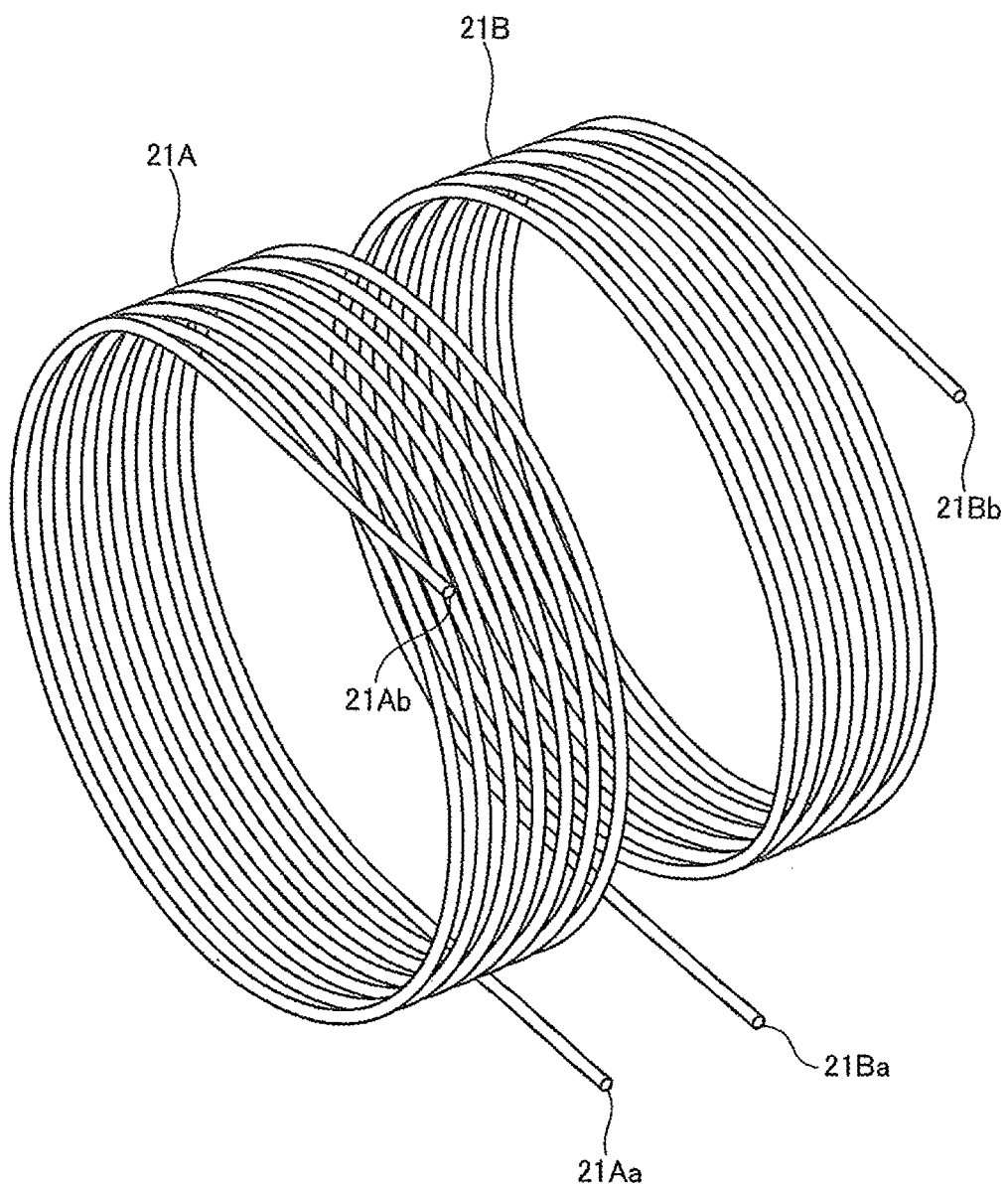
FIG. 3 is a drawing showing structures of cooling-water pipes of the dynamo-electric machine shown in FIGS. 1 and 2.

As shown in FIGS. 1 and 2, an outer peripheral surface of a cylindrical stator 12 is fixed to an inner peripheral surface at a middle in an axial direction of a cylindrical hollow-shaped frame 11 made of aluminum metal, which is high heat transfer material, so that the stator 12 is coaxial with the frame 11. Further, a rotation shaft 14 is provided so as to penetrate an inside of the stator 12 and be coaxial with the stator 12. The rotation shaft 14 is rotatably supported, at both end sides thereof, by a pair of annular brackets 15 that are fixed to both end sides of the frame 11.

A permanent magnet 13a is provided on an outer peripheral surface at a middle in the axial direction of the rotation shaft 14 throughout an entire circumference of the rotation shaft 14 so as to face an inner peripheral surface of the stator 12. Further, a cylindrical ring 13b that is made of iron or the like having magnetism is fitted so as to fix the permanent magnet 13a on the outer peripheral surface of the rotation shaft 14. The permanent magnet 13a and the ring 13b etc. form a rotor 13. In other words, the rotation shaft 14 is fixed to the rotor 13 so as to penetrate an inside of the rotor 13. The rotor 13 is provided inside the stator 12 such that a gap G having a specified distance is formed between the inner peripheral surface of the stator 12 and an outer peripheral surface of the ring 13b.

At both end sides in the axial direction on a peripheral surface of the frame 11, first supply openings 16 and exhaust openings 18 through which an inside and an outside of the frame 11 communicate with each other are formed so as to face each other. At a middle in the axial direction on the peripheral surface of the frame 11, a plurality of second supply openings (in the present embodiment, two second supply openings) 17 through which ducts 12a that are radially formed at a middle portion in the axial direction of the stator 12 and that communicate with the gap G and the outside of the frame 11 communicate with each other are formed at regular intervals along a circumferential direction of the frame 11.

Further, at a middle in the axial direction between an outer peripheral surface and an inner peripheral surface of the frame 11, helical stainless (SUS) cooling-water pipes 21A and 21B (see FIG. 3) are formed by casting such that these cooling-water pipes 21A and 21B are arranged as a pair at one end side and the other end side of the middle of the frame 11. The cooling-water pipes 21A and 21B have inlets 21Aa and 21Ba respectively that are exposed to the outside of the frame 11 at lower positions at the middle in the axial direction of the frame 11. The cooling-water pipes 21A and 21B also have outlets 21Ab and 21Bb respectively that are exposed to the outside of the frame 11 at upper positions at the both end sides in the axial direction of the frame 11.

In the drawing, reference signs 19 denote coil ends.

Figure 4:
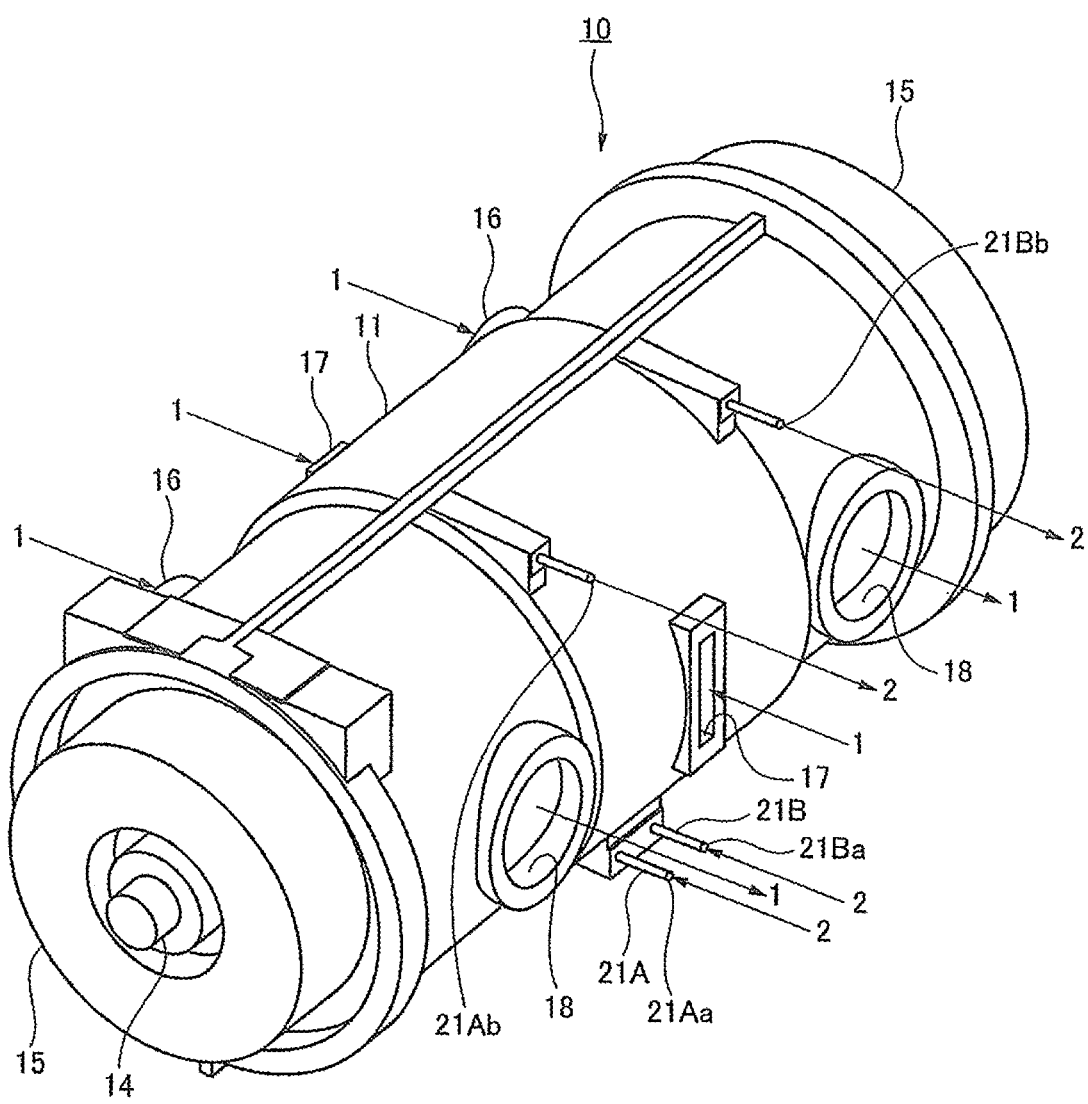
FIG. 4 is a drawing for explaining supply and exhaust directions of cooling water and cooling air flow of the dynamo-electric machine shown in FIG. 1.

In such dynamo-electric machine 10 of the present embodiment, as depicted in FIG. 4, cooling air flows 1 are supplied into the frame 11 from the first and second supply openings 16 and 17, and cooling waters 2 are supplied to the cooling-water pipes 21A and 21B from the inlets 21Aa and 21Ba.

Figure 5:
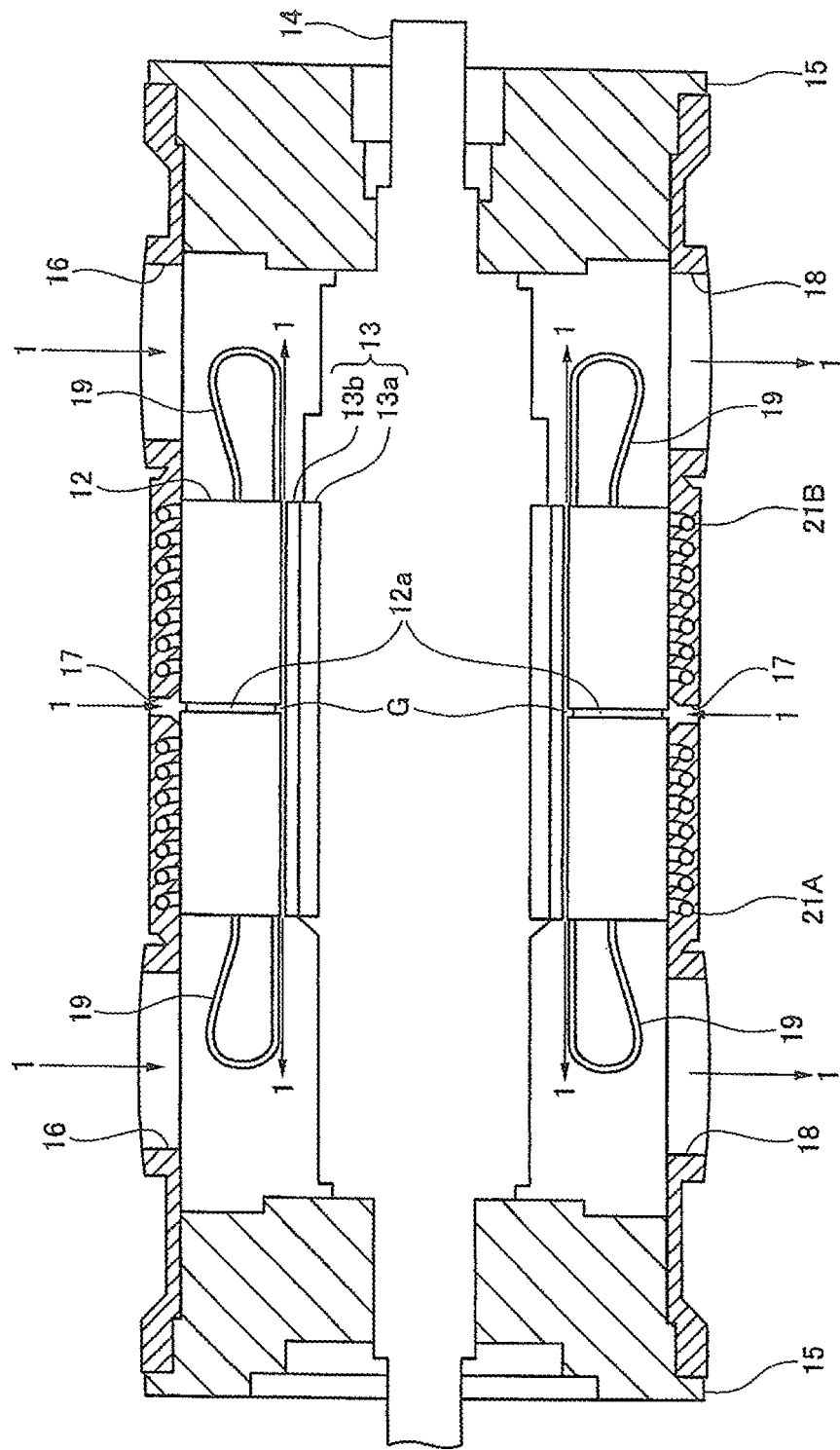
FIG. 5 is a drawing for explaining flow directions of the cooling air flow of the dynamo-electric machine shown in FIG. 2.

Then, as depicted in FIG. 5, the cooling air flows 1 supplied from the first supply openings 16 flow to the both end sides in the axial direction in the frame 11 while cooling the coil ends 19 etc., and are exhausted to the outside of the frame 11 from the exhaust openings 18. The cooling air flows 1 supplied from the second supply openings 17 flow in the ducts 12a of the stator 12 while cooling the stator 12 from the middle portion in the axial direction of the stator 12, and reach the gap G. These cooling air flows 1 branch off from the axial direction middle portion, and further flow in the gap G toward the both end sides of the frame 11 while cooling the inner peripheral surface of the stator 12 and an outer peripheral surface of the rotor 13. The cooling air flows 1 flowing out from the gap G join or meet the cooling air flows 1 supplied from the first supply openings 16, and are exhausted to the outside of the frame 11 from the exhaust openings 18.

On the other hand, the cooling waters 2 supplied from the inlets 21Aa and 21Ba flow in the cooling-water pipes 21A and 21B. That is, the cooling waters 2 cool almost all the stator 12 from an outer peripheral surface of the stator 12 through the frame 11 while helically flowing on the outer peripheral surface of the stator 12 from the axial direction middle to the both end sides of the stator 12, and are exhausted from the outlets 21Ab and 21Bb.

That is to say, in the dynamo-electric machine 10 according to the present embodiment, not only the coil ends 19 are cooled by the cooling air flows 1 supplied from the first supply openings 16, but also an inside of the axial direction middle portion of the stator 12, which is highest in temperature at the stator 12, is air-cooled from a radial direction outer side to a radial direction inner side by the cooling air flows 1 supplied from the second supply openings 17, and further the inner peripheral surface of the stator 12 and an outer peripheral surface of the rotor 13 are air-cooled from the axial direction middle portion to the both end sides by the cooling air flows 1 supplied from the second supply openings 17. Moreover, by the cooling waters 2 supplied from the inlets 21Aa and 21Ba, the outer peripheral surface of the stator 12 is water-cooled from the axial direction middle portion of the stator 12, which is highest in temperature at the stator 12, to the both end sides of the stator 12.

Hence, in the dynamo-electric machine 10 of the present embodiment, even in a case where a thick high-voltage insulating paper is used at the inside of the stator 12 and winding portions such as the coil ends 19 in response to the high output and also the rotor 13 is fixed to the rotation shaft 14 with the permanent magnet 13a being surrounded with the ring 13b in response to the high speed rotation, the inside of the stator 12, the winding portions such as the coil ends 19 and the permanent magnet 13a of the rotor 13 are effectively cooled, and the temperature increase can be greatly suppressed.

Accordingly, according to the dynamo-electric machine 10 of the present embodiment, since cooling performance can be greatly improved, even higher output and even higher speed rotation can be achieved.

Further, since the stator 12 is cooled by the cooling waters 2 flowing parallel in the two cooling-water pipes 21A and 21B, a quantity of flow (or a flow rate) per unit time of the cooling water 2 can be increased without increasing pressure loss in the cooling-water pipes 21A and 21B Therefore, cooling performance by the cooling water 2 can be greatly improved.

INDUSTRIAL APPLICABILITY

The dynamo-electric machine according to the present invention is capable of achieving even higher output and even higher speed rotation by greatly improving the cooling performance. Therefore, the dynamo-electric machine of the present invention can be effectively utilized in industry.

EXPLANATION OF REFERENCE

1 . . . cooling air flow, 2 . . . cooling water, 10 . . . dynamo-electric machine, 11 . . . frame, 12 . . . stator, 12a . . . duct, 13 . . . rotor, 13a . . . permanent magnet, 13b . . . ring, 14 . . . rotation shaft, 15 . . . bracket, 16 . . . first supply opening, 17 . . . second supply opening, 18 . . . exhaust opening, 19 . . . coil end, 21A, 21B . . . cooling-water pipe, 21Aa, 21Ba . . . inlet, 21Ab, 21Bb . . . outlet, G . . . gap

The invention claimed is:

1. A dynamo-electric machine comprising:
a cylindrical frame;
a cylindrical stator fixed to an inside of the frame;
a cylindrical rotor provided inside the stator such that a gap is formed between the rotor and the stator;
a rotation shaft fixed to the rotor so as to penetrate an inside of the rotor; and
a bracket fixed to the frame and rotatably supporting the rotation shaft,
wherein the stator has a duct radially formed at a middle portion in an axial direction of the stator and communicating with the gap,
the frame has a first supply opening through which cooling air flow is supplied in the frame at axial direction both end sides of the frame, an exhaust opening through which cooling air flow in the frame is exhausted to an outside of the frame and a second supply opening through which cooling air flow is supplied to the duct of the stator,
the dynamo-electric machine further comprises cooling-water pipes provided as a pair at one end side and the other end side of a middle in the axial direction of the frame,
wherein the cooling-water pipes has, at the middle in the axial direction of the frame, inlets through which cooling water is supplied to the cooling-water pipes and has, at the axial direction both end sides of the frame, outlets through which the cooling water is exhausted from the cooling-water pipes, and
the second supply opening is located between the inlets of the both cooling-water pipes.

2. The dynamo-electric machine as claimed in claim 1, wherein:
the frame is an aluminum metal-made frame having the cooling-water pipes between an outer peripheral surface and an inner peripheral surface of the frame by casting.

* * * * *